(12) United States Patent
Yoshioka (10) Patent No.: US 7,376,442 B2
(45) Date of Patent: May 20, 2008

(54) MOBILE COMMUNICATION TERMINAL AND APPLICATION STARTING CONTROL METHOD THEREOF

(75) Inventor: Kenji Yoshioka, Tokyo (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 11/104,483

(22) Filed: Apr. 13, 2005

(65) Prior Publication Data

US 2005/0243760 A1    Nov. 3, 2005

(30) Foreign Application Priority Data

Apr. 14, 2004    (JP) .............................. 2004-118826

(51) Int. Cl.
*H04B 1/38*        (2006.01)
(52) U.S. Cl. ..................... 455/556.2; 455/566; 718/107
(58) Field of Classification Search ................ 370/338; 455/566, 550.1, 556.2; 718/107
See application file for complete search history.

(56) References Cited

U.S. PATENT DOCUMENTS

| | | | | |
|---|---|---|---|---|
| 5,487,170 | A * | 1/1996 | Bass et al. .................. | 710/244 |
| 6,389,447 | B1 * | 5/2002 | Singh ......................... | 718/100 |
| 6,608,637 | B1 * | 8/2003 | Beaton et al. .............. | 715/762 |
| 7,103,387 | B2 * | 9/2006 | Seo ............................. | 455/566 |
| 2004/0172631 | A1 * | 9/2004 | Howard ....................... | 718/100 |

FOREIGN PATENT DOCUMENTS

| | | |
|---|---|---|
| EP | 0 953 905 | 11/1999 |
| EP | 1 376 353 | 1/2004 |
| JP | 2003-330579 | 11/2003 |
| WO | WO 01/86415 | 11/2001 |

OTHER PUBLICATIONS

Silberschatz, A.S. et al. "Operating System Concepts" Operating System Concepts, 1994, Reading, MA.

* cited by examiner

*Primary Examiner*—Edward F. Urban
*Assistant Examiner*—Adeel Haroon (57) ABSTRACT

In a mobile communication terminal for starting and simultaneously using a plurality of applications, one desired application starts fast to improve the operability when the number of started applications reaches a present limiting number of applications. An application start determining unit searches a list of started applications in response to the instruction of the start of application to obtain the number of started applications, and determines that the application cannot start when the number of started applications reaches a preset limiting number of applications. An ending-application selecting unit selects, as an ending application to be ended, the application with the low priority from the start applications based on the preset priority of application when the application start determining unit determines that the application cannot start. An application ending unit performs the ending processing of the ending application selected by the ending-application selecting unit and deletes the selected ending application from the list of started applications.

3 Claims, 8 Drawing Sheets

|  | a | b | c |
|---|---|---|---|
| COMMUNICATION APL | 0.50 | 0.30 | 0.20 |
| EDITING APL | 0.75 | 0.45 | 0.30 |
| OTHER APLS | 1.00 | 0.60 | 0.40 |

FIG. 8

| STARTED APL | A | B | C | X |
|---|---|---|---|---|
| BROWSER (COMMUNICATION) | 3 | 1 | 2 | 2.20 |
| MEMO (EDT) | 2 | 3 | 3 | 3.75 |
| VIEWER (OTHER) | 1 | 2 | 1 | 2.60 |

MOBILE COMMUNICATION TERMINAL AND APPLICATION STARTING CONTROL METHOD THEREOF

This application claims priority to prior Japanese patent application JP 2004-118826, the disclosure of which is incorporated herein by reference.

BACKGROUND OF THE INVENTION

The present invention relates to a mobile communication terminal and an application starting control method thereof. More particularly, the present invention relates to a mobile communication terminal for starting and simultaneously using a plurality of applications and an application starting control method thereof.

Recently, one type of mobile phones is sold to start a plurality of applications and simultaneously use a plurality of functions similarly to a personal computer or the like, under the improvement of CPU processing capacity.

Such a mobile phone terminal enables a user to send an email while viewing a site screen on the Internet or to check the schedule by a scheduler while having a call.

However, the mobile phone terminal does not have a sufficient memory capacity or power capacity. Therefore, if many applications simultaneously start similarly to the personal computer, a malfunction is caused in the communication function or the started application operation becomes unstable.

An unnecessary application must terminate without continuously staying resident in memory when the number of simultaneously-used applications reaches a predetermined limiting number. Preferably, the unnecessary application automatically ends.

Japanese Unexamined Patent Application Publication (JP-A) No. 2003-330579 discloses a mobile electronic device which ends the applications whose number reaches the limiting number. As disclosed in the above-mentioned publication, the degree of importance is set to the application so as to use the application with the high degree of importance for a long time when the remaining amount of battery is reduced while a plurality of applications start, and the application with the low degree of importance ends when the remaining amount of battery reduces. However, when the number of applications to be started is over a predetermined number, the application to be ended does not automatically end.

SUMMARY OF THE INVENTION

It is an object of the present invention to provide a mobile communication terminal and an application starting control method thereof, for fast starting a desired application and improving the operability by automatically selecting and ending the application to be ended when the number of started applications reaches a predetermined limiting number upon starting the application.

According to the present invention, there is provided an application starting control method of a mobile communication terminal for starting and simultaneously using a plurality of applications, comprising the steps of presetting a limiting number of simultaneously used applications; selecting, from started applications, an ending application to be ended based on the priority when applications over a limiting number are going to be started; and newly allowing to start an application after ending the selected ending application.

The priority may be preset or may be determined based on a using situation of the started application.

The selected ending application may be displayed on a screen in response to the selection of the ending application. In this case, the selected ending application is ended in response to the approval operation of a user.

According to the present invention, there is also provided a mobile communication terminal for starting and simultaneously using a plurality of applications, comprising application start determining means which compares the number of started applications with a preset limiting number of simultaneously used applications, determines that the application can start when the number of started applications is less than the limiting number, and determines that the application cannot start when the number of started applications reaches the limiting number; selecting means which selects an ending application to be ended on the basis of low priority from the started applications in response to the determination of the application start determining means that the application cannot start; application ending means which performs ending processing of the ending application selected by the ending application selecting means; and application starting means which starts the application instructed by a user in response to the determination of the application start determining means that the application can start.

The application starting means may start the application instructed by the user in response to the ending processing of the application ending means.

The application start determining means may determine whether or not the application starts in response to the instruction to start the application from the user.

The mobile communication terminal may have a list of started applications indicating the started applications. In this case, the application start determining means searches the list of started application to obtain the number of started applications. The application ending means deletes the selected ending application from the list of started applications. The application starting means starts the application determined as the start by the application start determining means and registers the started application to the list of started applications.

The mobile communication terminal may further comprises means for receiving the approval of the user before the ending processing of the ending application in response to the selection of the ending application by the ending application selecting means.

According to the present invention, there is also provided a mobile communication terminal for starting and simultaneously using a plurality of applications, comprising application start determining means which compares the number of started applications with a preset limiting number of simultaneously used applications, determines that the application can start when the number of started applications is less than the limiting number, and determines that the application cannot start when the number of started applications reaches the limiting number; ending-priority list creating means which calculates values indicating the using situation of the started applications in response to the determination of the application start determining means that the application cannot start and creates a list of ending priority indicating the order of applications with low influence in the case of ending the application; ending-application selecting means which selects the ending application based on the list of ending priority in response to the determination of the application start determining means that the application cannot start and clears the list of ending priority; application ending means which performs the ending processing of the ending application selected by the ending-application selecting means; and application starting means which starts the application instructed by a user in response to the determination of the application start determining means that the application starts.

The ending-priority list creating means may collect data on evaluation items indicating the using situations including the total time displayed after starting the application, the number of switching times for display operation, and the last display time, place a number to each of started applications in the order of their magnitude every evaluated item, multiply the number by a weighting coefficient preset every evaluated item and every type of application, add the multiplied results every application, calculate the values indicating the using situations, sort the applications in order of the larger values, and create the list of ending priority.

The mobile communication terminal may have a list of started applications indicating the started application. In this case, the application start determining means searches the list of started applications and obtains the number of started applications; the application ending means deletes the selected ending application from the list of started applications, and the application starting means starts the application determined as the start by the application start determining means and registers the started application to the list of started applications.

According to the present invention, the limiting number (maximum number) of applications for simultaneous use is set and when the start of a new application amounts to the number of applications over the limiting number, the application for ending is automatically determined and is ended in accordance with the priority from among the using applications. Thus, in case that the number of applications reaches the limiting number, the new application is started quickly and the operability upon starting the application is improved.

DESCRIPTION OF THE PREFERRED EMBODIMENTS

Hereinbelow, description will be given of a mobile phone device among mobile communication terminals.

Figure 1:
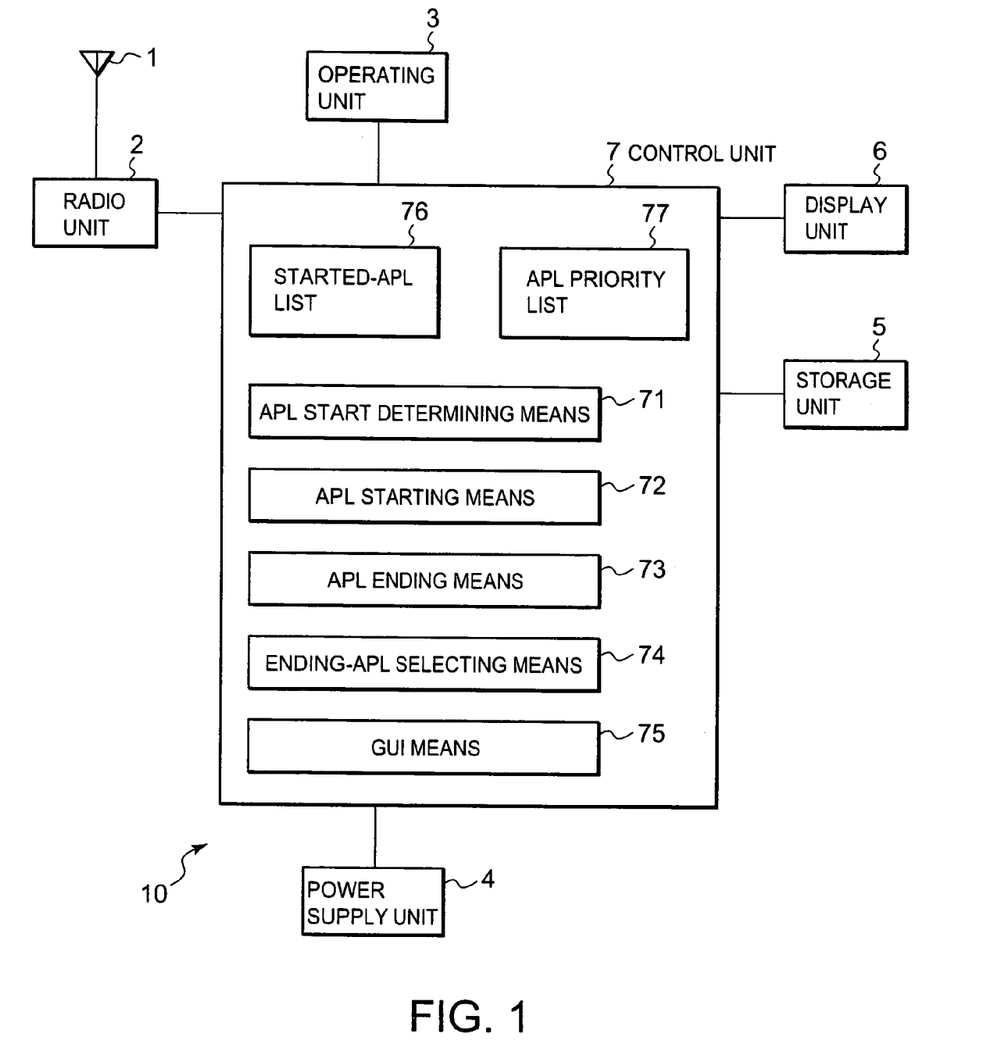
FIG. 1 is a block diagram showing a mobile phone terminal according to a first embodiment of the present invention.

FIG. 1 is a block diagram showing a mobile phone device according to the first embodiment of the present invention.

A mobile phone 10 comprises a radio unit 2 which receives and sends signals via an antenna 1, an operating unit 3 having buttons operated by a user, a power supply unit 4 which supplies power to units, a storage unit 5 which stores various applications and data, a display unit 6 which displays various information, and a control unit 7 which controls the start/end of application upon being instructed of the start of application designated by the user via the operating unit 3 and which instruct to display various information on the display unit 6.

The control unit 7 reads various control programs stored in the memory in accordance with an instruction from the operating unit 3, and controls operations of the terminal.

The control unit 7 comprises: a started application (abbreviated to an APL) list 76; and an APL priority list 77 indicating the predetermined priority of application.

The control unit 7 comprises APL start determining means 71 which determines, based on a started-APL list 76 and a predetermined limiting number of applications, whether or not the user's desired application is allowed to start, upon being notified of the start of application; APL starting means 72 which performs the start processing of the application determined to be started and which instructs to make an entry of application to the started-APL list 76; and APL ending means 73 which performs the ending processing of application for ending (i.e., application to be ended, which may herein be referred to as an ending application) and which deletes the ending application from the started-APL list 76.

Further, the control unit 7 comprises ending-APL selecting means 74 which selects one of applications for ending from among the started applications based on the started-APL list 76 and the predetermined APL priority list 77 when the APL start determining means 71 determines that the application is not allowed to start. In addition, the control unit 7 includes GUI (graphical user I/F) means 75 which attends to display an ending-APL selecting screen prompting a user's entry and notify the ending-APL selecting means 74 of a user selected result when the application for ending is not automatically selected by the ending-APL selecting means 74. The GUI also has a function to attend to display an APL menu screen and notify the APL start determining means 71 of a user selected result in accordance with the user button operation.

In the first embodiment, let us assume a situation where the maximum number of applications for simultaneous use is set as a limiting number of applications. In this case, the memory size available to applications is determined based on the memory capacity. Therefore, the maximum number of applications for simultaneous use is set in consideration of the combination of applications for simultaneous use so as to prevent the trouble of a system due to the shortage of memory. For example, in the case of the mobile phone mainly having a communication function, the maximum number of applications for simultaneous use is set as 6.

Figure 2:
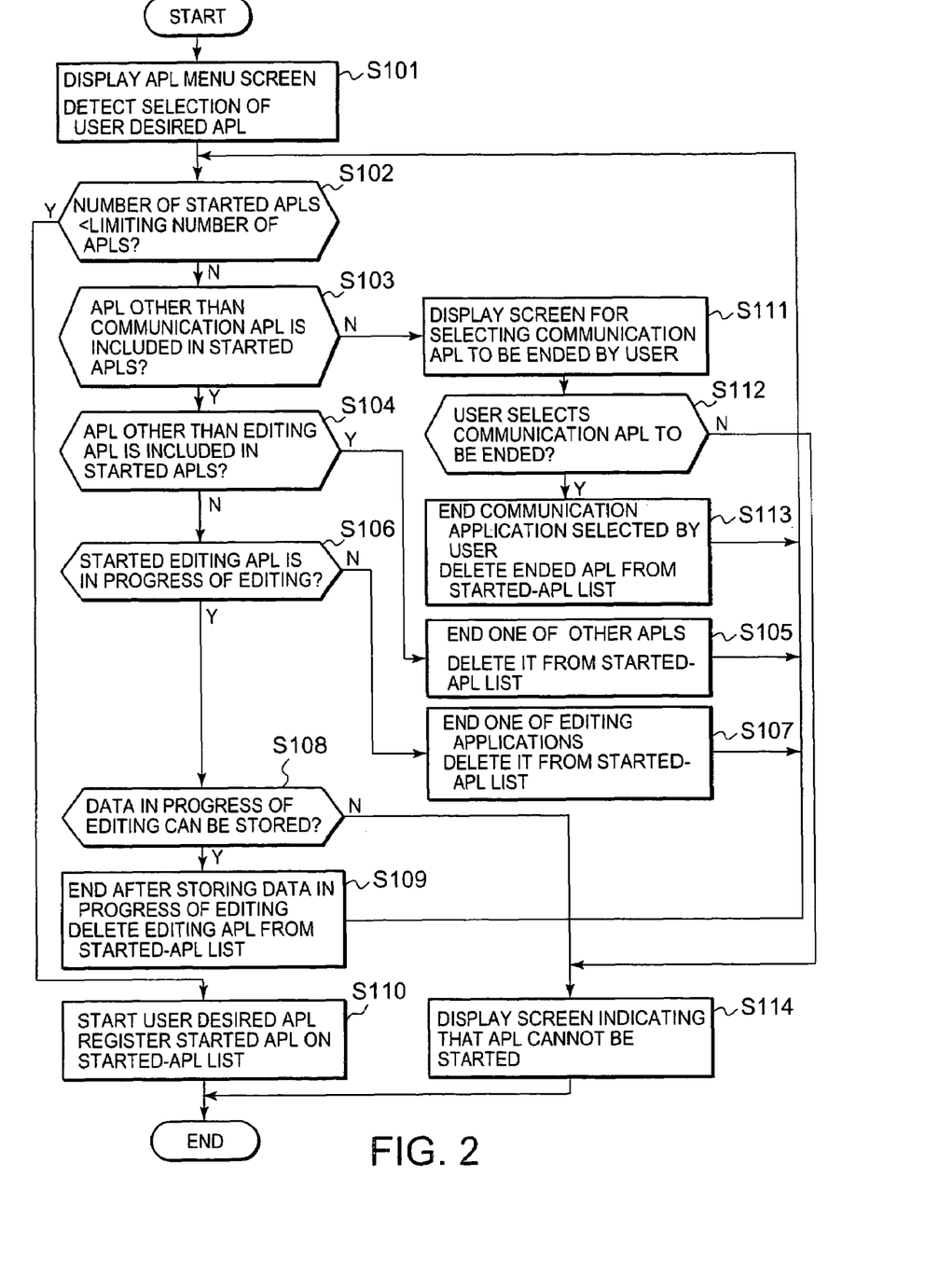
FIG. 2 is a flowchart showing an operating example of a control unit shown in FIG. 1.

FIG. 2 is a flowchart showing an operating example of the control unit 7. A description is given of the mobile phone mainly having the communication function in accordance with the flowchart shown in FIG. 2, together with referring to FIG. 1 and FIGS. 3 to 5 showing display screens.

The user operates a button of the operating unit 3 so as to start the desired application and instructs to display an APL menu screen. Then, the GUI means 75 attends to detect the button operation, instruct the display unit 5 to display the APL menu screen as shown in FIG. 3(b) instead of a standby screen shown in FIG. 3(a) (in step S101).

The APL menu screen displays application icons of email creation, Internet browser, game, system setting, accessory, communication, phone book, and digital camera.

The user selects the icon including the desired application from the icons displayed on the APL menu screen and then the applications included in the selected one are displayed.

Figure 3:
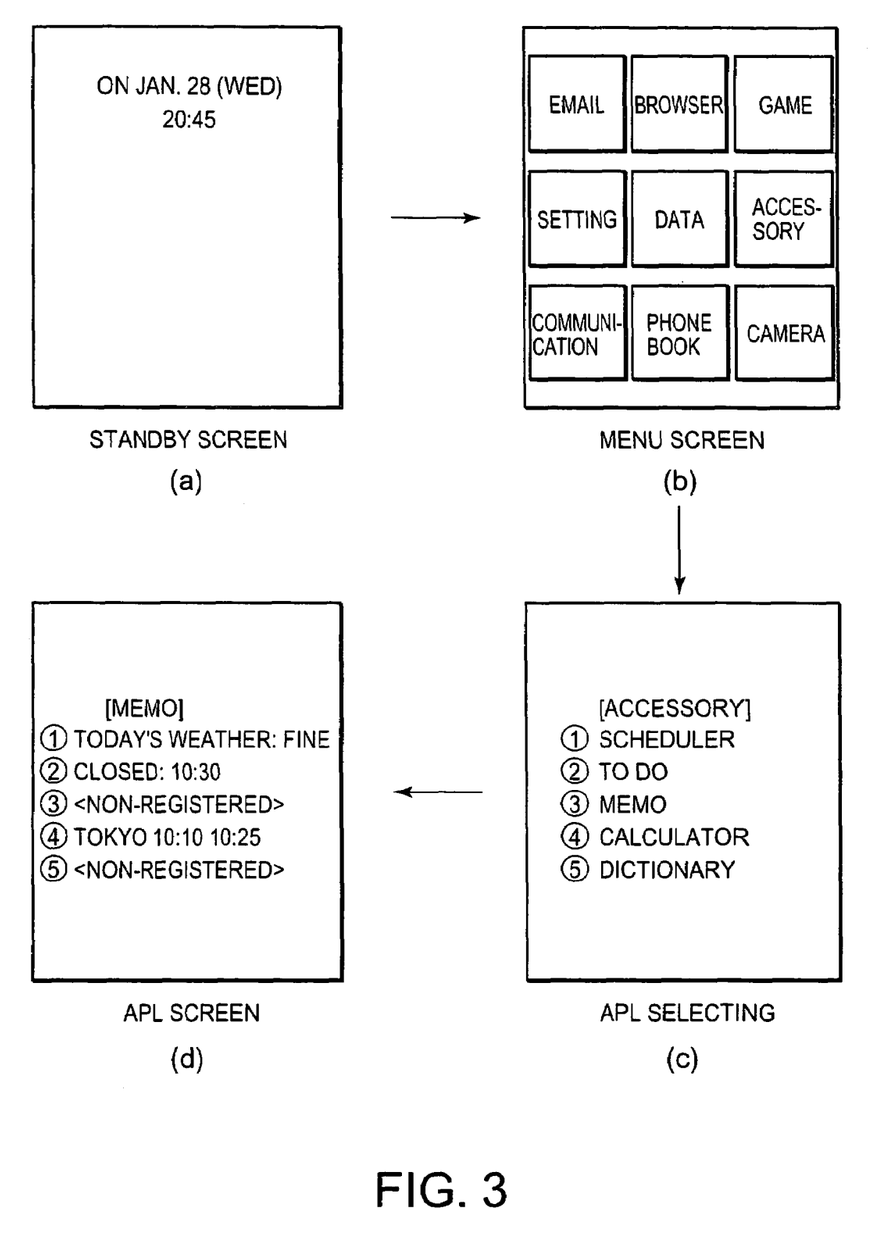
FIG. 3 shows examples of a display screen.

On the screen shown in FIG. 3(b), application "accessory" is selected. Then, referring to FIG. 3(c), the list of applications included in the application "accessory" are displayed.

Here, the user selects application "memo". In response to the selection, the GUI means 75 sends a notification indicating the start of application "memo" selected by the user to the APL start determining means 71.

On receipt of the notification of the start of application, the APL start determining means 71 retrieves the started-APL list 76. If the number of started applications is less than the limiting number of applications, it is determined that the application starts, and the APL start determining means 71 notifies the APL starting means 72 of the start of application (in step S102).

In response to the notification of start, the APL starting means 72 starts the application (here, application "memo"), registers it on the started-APL list 76, and sends a notification to the GUI means, which instructs to display the screen of application "memo" as shown in FIG. 3(d) (in step S110).

When the APL start determining means 71 searches the started-APL list 76 in step S102 and the number of started applications reaches the limiting number, the APL start determining means 71 determines that the application is not allowed to start, and notifies the APL selecting means 74 of such denial (in step S102).

In response to receipt of the notification of the denial, the ending-APL selecting means 74 performs the processing for selecting one application for ending from the started applications based on the predetermined APL priority list 77 and the started-APL list 76.

Let us assume that the applications are classified, for example, into three types, i.e., communication application, editing application, and other application and that the three types of applications are registered in the started-APL list 76.

The type of communication application includes phone and data communication. The type of editing application includes email creation, memo, and phone book. The type of other applications includes the system setting, multimedia, and game.

According to the priority of application, a priority 1 is assigned to the communication application type, a priority 2, the editing application type, and a priority 3, other application type. That is, the applications are registered in the APL priority list 77 in the order of the types of communication application, the editing application, and other application.

The ending-APL selecting means 74 first searches, based on the started-APL list 76, whether or not the started applications include an application type other than the communication application type (in step S103).

If YES in step S103, the ending-APL selecting means 74 searches, based on the started-APL list 76, whether or not the started applications include an application type other than the editing application type (in step S104). If it is determined that the started applications include the other application type in addition to the editing application type, that is, other application with the low priority, the ending-APL selecting means 74 selects one of other applications and notifies the APL ending means 73 of the selected application. The APL ending means 73 performs the ending processing of the notified application, deletes the application from the started-APL list 76, and notifies the APL start determining means 71 of the completion of ending processing (in step S105).

If it is determined in step S104 that the started applications do not include the application other than the editing application, it is checked to see if the started editing application is in progress of editing processing (in step S106), which indicates a state that the user is inputting character data and the edited data is not determined.

If NO in step S106, the ending-APL selecting means 74 selects one editing application as the ending application, and notifies the APL ending means 73 of the selection. The APL ending means 73 performs the ending processing of the notified application, deletes the notified application from the started-APL list 76, and notifies the APL start determining means 71 of the completion of ending processing (in step S107).

In response to the notification of the completion of ending processing, the APL start determining means 71 determines, based on the started-APL list 76, the start of the user's desired application and notifies the APL starting means 72 thereof to start the application (in step S102).

Even during the editing processing of editing application, when necessary data is inputted in an input field and the memory area is available to store the data in progress of editing (in step S108), the ending-APL selecting means 74 selects one of the editing applications, and notifies the APL ending means 73 of the selected editing application for ending processing.

In this case, the APL ending means 73 stores the data in progress of editing of the editing application for ending processing in the storage unit 6, ends the editing application, deletes it from the started-APL list 76, and notifies the APL start determining means 71 of the completion of ending processing (in step S109).

Figure 4:
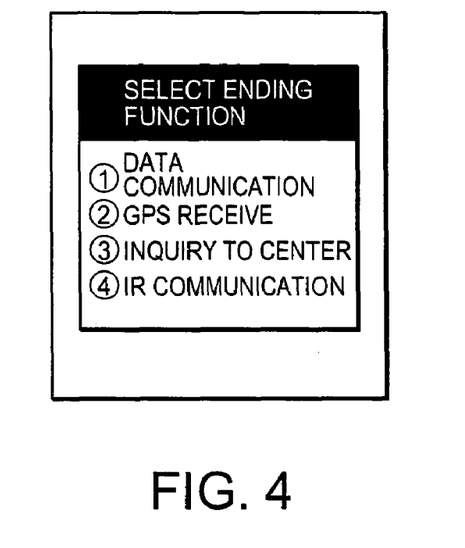
FIG. 4 is a diagram showing another example of the display screen.

When the ending-APL selecting means 74 determines in step S103 that the started applications do not include any application other than the communication one, namely, when the entire started applications as the ending target are the communication applications with the high priority, the GUI means 75 instructs to display the screen for selecting the communication application for ending from among the started communication applications by the user as shown in FIG. 4 (in step S111).

When the user selects the communication application for ending (in step S112), the GUI means 75 notifies the ending-APL selecting means 74 of the communication application selected by the user.

The ending-APL selecting means 74 notifies the APL ending means 73 of the communication application selected by the user. The APL ending means 73 ends the notified communication application, deletes the ended communication application from among the started-APL list 76, and notifies the APL start determining means 71 of the completion of ending processing (in step S113).

In response to notification of the completion of ending processing, the APL start determining means 71 determines based on the started-APL list 76 that the user's desired application can start, notifies the APL starting means 72 of the determining result to start the application (in step S110).

Figure 5:
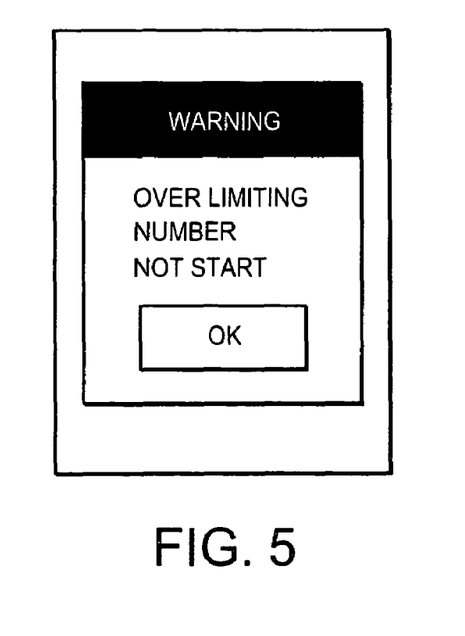
FIG. 5 is a diagram showing yet another example of the display screen.

When the data in progress of editing is not stored in step S108 or when the user does not select the communication application for ending in step S112, a dialog screen indicating that the application can not start is displayed by the GUI means 75 as shown in FIG. 5 (in step S114).

As mentioned above, when applications over the limiting number start, the application to be ended is automatically selected from among the started applications based on the predetermined priority and thereafter the application newly designated by the user starts, thereby omitting the troublesomeness for selecting the application to be ended by the user upon starting the application. Thus, the operability is improved.

The priority of application may be determined depending on the types of functions installed on the terminal or main purposes of the terminal. For example, in the case of a mobile communication terminal mainly functioning as multimedia, the priority is given to multimedia applications such as a moving image or music play.

Further, the list of APL priority may be set by the user depending on the user's favor.

Figure 6:
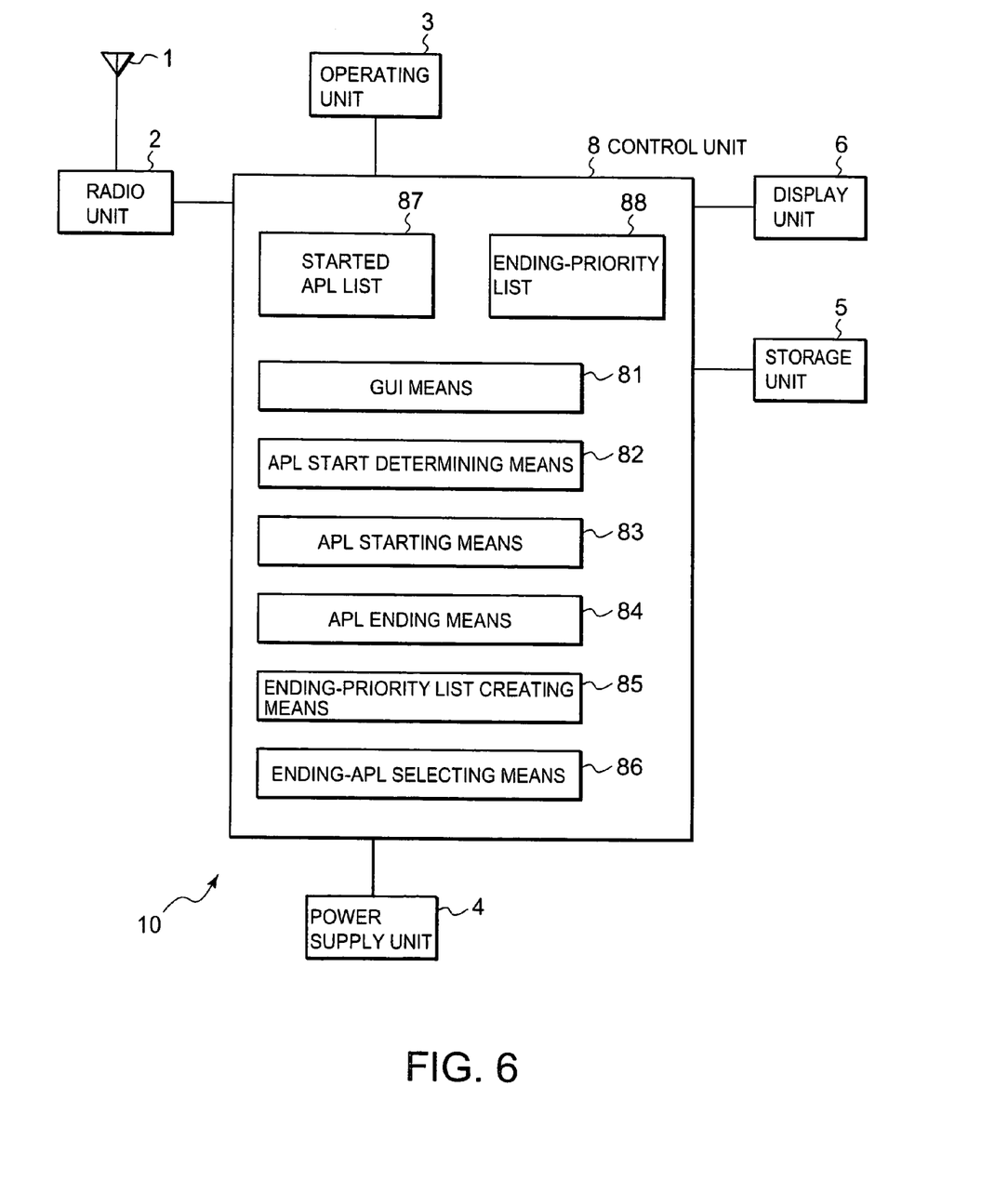
FIG. 6 is a block diagram showing a mobile phone terminal according to a second embodiment of the present invention.

FIG. 6 is a block diagram showing a mobile phone terminal according to the second embodiment.

A control unit according to the second embodiment shown in FIG. 6 differs from the control unit 7 shown in FIG. 1 in that a value indicating the using situation of the started application is calculated to create the list of ending priority, and the application to be ended is selected based on the list of ending priority.

Referring to FIG. 6, a control unit 8 comprises GUI means 81 which instructs to display a menu screen in accordance with the button operation of the user, notifies APL start determining means 82 of a user's selected result, and the APL start determining means 82 which determines, based on a started-APL list 87 and a predetermined limiting number of applications (the maximum number of started applications) upon receipt of a notification of the start of application, whether or not the user's designated application (APL) should start.

Further, the control unit 8 comprises APL starting means 83 which performs the start processing of the application determined to be started and which instructs to register the application to the started-APL list 87; APL ending means 84 which performs the ending processing of the application to be ended and deletes the ending application from the started-APL list 87; ending-priority list creating means 85 which calculates a value indicating the using situation of the started application and creates an ending-priority list 88 when the APL start determining means 82 determines that the application does not start; and ending-APL selecting means 86 which select one of the applications to be ended from the upper application in the ending-priority list 88 when the APL start determining means 82 determines that the application does not start.

Figure 7:
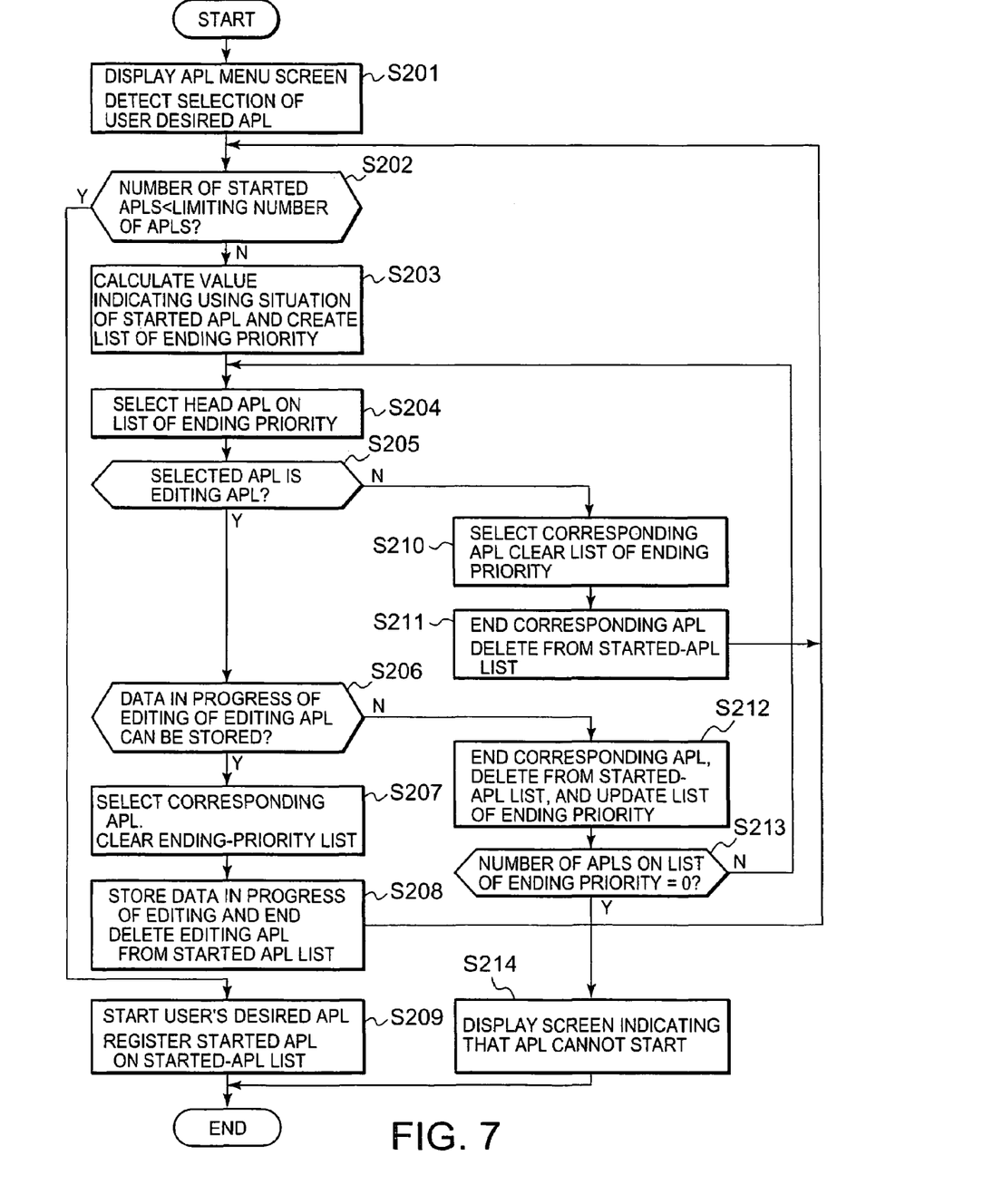
FIG. 7 is a flowchart showing an operating example of a control unit shown in FIG. 6.

FIG. 7 is a flowchart showing an operating example of the control unit 8.

With reference to FIG. 7, the operation of the control unit shown in FIG. 6 will be described in connection with the mobile phone mainly having a communication function by way of example.

The user operates a button to start his desired application and instructs an APL menu screen display. Then, the GUI means 81 detects the button operation and instructs to display the APL menu screen (in step S201). Here, the user selects his desired application and the GUI means 81 notifies the APL start determining means 82 of the application to be started.

The APL start determining means 82 which receives the notification of the start of the user's desired application searches the started-APL list 87, and determines whether or not the number of started applications is less than the limiting number of applications. When the number of started applications is less than the limiting one, the APL start determining means 82 determines that the application can be started and then notifies the APL starting means 83 of the start of the corresponding application (in step S202). The APL starting means 83 starts the user's desired application and registers the started application on the started-APL list 87 (in step S209).

When the number of started applications reaches the limiting number of applications, the APL start determining means 82 determines in step S202 that the application cannot be started. Then, the APL start determining means 82 sends a notification of the determined result to the ending-priority list creating means 85, which creates the list of ending priority, and the ending-APL selecting means 86, which executes the selecting processing of the ending application.

The ending-priority list creating means 85 calculates a value indicating the using situation of the started applications and creates the ending-priority list 88 (in step S203).

Here, a description is given of the creation of the list of ending priority. Generally, the using situation of application is estimated based on the screen display time, the number of display times on the screen, and the using time. That is, as the application is frequently used, the display time on the screen and the number of display times on the screen of the application are larger. Further, as the last display time of the application is latest, the application is used with higher possibility at the next time.

For the started applications, data for evaluation items is collected. The data includes the total display time after starting the application, the number of switching times of the display operation, and the last display time. The order of applications is obtained every evaluation item and the value indicating the using situation is calculated.

The order of the total display time is designated by reference numeral A, the order of the number of switching times of the display operation is designated by reference numeral B, the order of the last display time is designated by reference numeral C, and a value X indicating the using situation is calculated as follows.

$$X = aA + bB + cC$$

where a, b, and c denote weighting coefficients which are preset to the total display time, the number of switching times of the display operation, and the last display time, and are arbitrarily set depending on which evaluation item is focused.

Assuming that reference symbol N denotes the limiting number of started applications, values of A, B, and C indicating the orders of the evaluation items are $N \geq A, B, C \geq 1$.

In the case of the application that is not used, the values of A, B, and C are large. If the values of A, B, and C are larger, the value of X is large. Therefore, as the application has a larger value of X, the application is not used.

Sorting the applications in accordance with the larger value of X, it is possible to create the ending-priority list 88 indicating the order of applications in which the least significant application comes first. The application which is not used with high frequency is positioned at the head of the ending-priority list, and the application which is used with high frequency is positioned at the end of the ending-priority list.

The individual values of the weighting coefficients a, b, and c may be set depending on the type of application. For example, in the case of the mobile phone mainly having the communication function, the types of application are three, that is, a type of communication application, a type of editing application, and a type of other application. Assuming that the using priority is in the order of the communication application type, editing application type, and other application type, the weighting coefficients a, b, and c of the applications are set as shown in FIG. 8.

Assume further that the three applications, namely, "browser (communication)" serving as the communication application type, "memo (edit)" serving as the editing application type, and "viewer (other)" serving as other application type are started.

Figure 8:
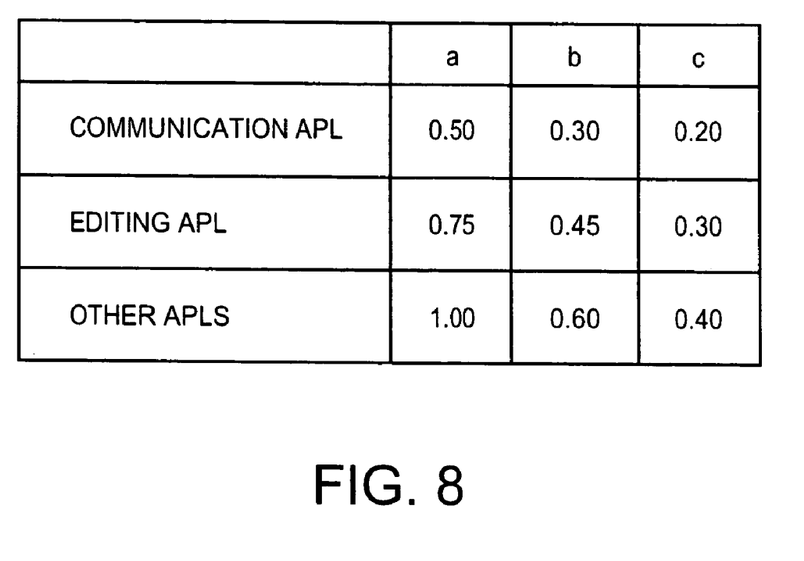
FIG. 8 is a diagram showing a setting example of a weighting coefficient for calculating a value indicating a using situation of each application.
Figure 9:
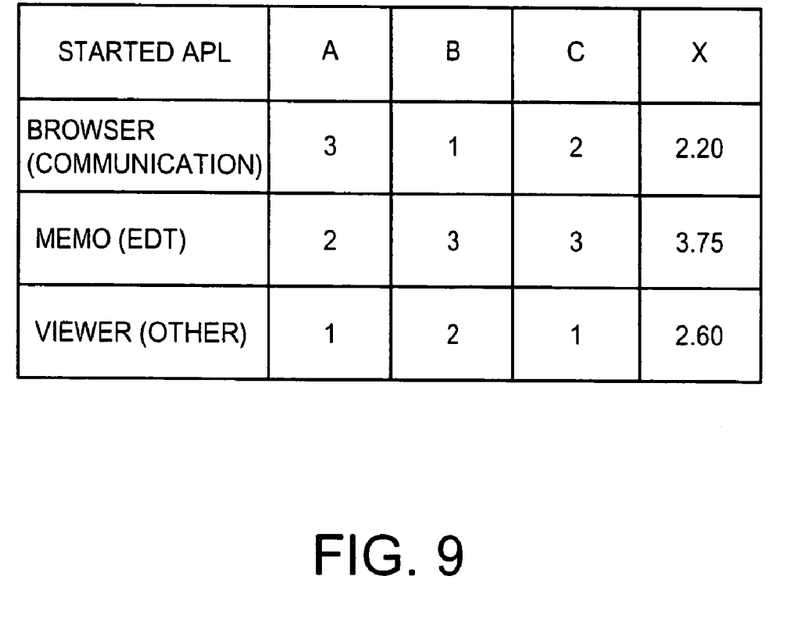
FIG. 9 is a diagram showing a calculating example of the value indicating the using situation and the order of each evaluation item of an application.

When the order of A, B, and C is determined among the applications every evaluation item as shown in the second to fourth columns in FIG. 9, the value X indicating the using situation of the application is calculated by using the weighting coefficients a, b, and c of the application shown in FIG. 8. As shown in the fifth column in FIG. 9, X=3.75 in the case of memo (edit), X=2.60 in the case of viewer (other), and X=2.20 in the case of browser (communication).

If the applications are sorted in the order of the larger value of X, memo (edit), viewer (other), browser (communication) are arranged in this order. The "memo" (edit) application is positioned at the head of the ending-priority list.

Referring to FIG. 7 again, the ending-APL selecting means 86 determines whether or not the application at the head of the ending-priority list 88 is the editing application (in step S204). If the application at the head of the ending-priority list 88 is the application different from the editing one, the application at the head is selected and the ending-priority list 88 is cleared. Further, the notification indicating the selection is sent to the APL ending means 84 to end the head application (in step S210). The APL ending means 84 ends the head application, deletes the ending application from the started-APL list 87, and notifies the APL start determining means 82 of the completion of the ending processing (in step S211).

In response to the notification of the completion of ending processing, the APL start determining means 82 determines based on the started-APL list 87 that the user's desired application can start (in step S202) and notifies the APL starting means 83 of the determined result. The APL starting means 83 starts the user's desired application and registers the started application on the started-APL list 87 (in step S209).

If the head application is the editing application in step S205, it is checked to see if the data in progress of editing can be stored (in step S206). If YES in step S206, namely, when the necessary data is inputted in the input field and the memory area necessary for storing the data is ensured, the corresponding application is selected and the ending-priority list 88 is cleared. Further, the notification of the selection is sent to the APL ending means 84 to end the head application (in step S207).

The APL ending means 84 stores the data in progress of editing of the head application to the storage unit 6, thereafter, ends the head application, deletes the ending application from the stared APL list 87, and notifies the APL start determining means 82 of the completion of ending processing (in step S208).

In response to the notification of the completion of the ending processing, the APL start determining means 82 determines based on the started-APL list 87 that the user's desired application can start, notifies the APL starting means 83 of the determination to start operation. Further, the APL starting means 83 starts the user's desired application and registers the started application on the started-APL list 87 (in step S209).

When the data in progress of editing is not stored in step S206, the application at the head of the ending-priority list 88 is deleted from the ending-priority list 88, a notification of the deletion is sent to the ending-priority list creating means 85, and the ending-priority list is updated. That is, the applications are sorted again in the order of the larger value of X indicating the using situation (in step S212).

The ending-APL selecting means 86 performs the selecting processing of the ending application after step S204 based on the ending-priority list that is updated, until the number of applications in the priority list is 0 (in step S213).

When the number of applications in the priority list is 0 in step S213, namely, when the entire started applications are the editing application and the data in progress of editing is not stored, it is determined that the application that can be ended does not exist. Further, the dialog screen indicating that the application does not start is displayed as in the example of the display screen shown in FIG. 5 (in step S214).

When the number of applications over the limiting number is going to be activated, the values indicating the using situation of the started applications are calculated and the ending-priority list is created. Then, the upper application in the ending-priority list is selected and ends. After that, the application newly-designated by the user starts and thus the operability upon starting the application is improved.

Incidentally, the priority of application may be determined depending on the functions or purposes of the terminal. For example, in the case of the mobile communication terminal mainly functioning as multimedia, the priority of multimedia application such as the moving image or music play is set to the upper class.

Further, the user may set the weighting coefficient used for calculating the value indicating the using situation.

Figure 10:
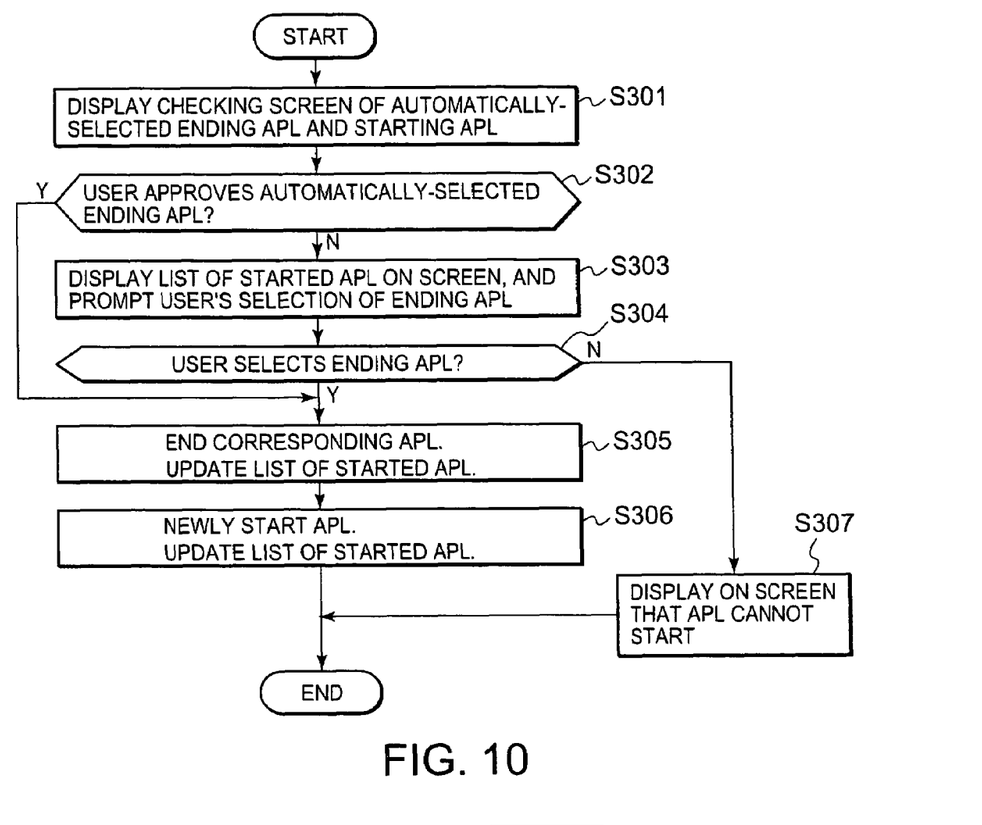
FIG. 10 is a flowchart showing an operation of a control unit according to a third embodiment of the present invention.

FIG. 10 is a flowchart showing the operation of a control unit according to the third embodiment. Upon automatically selecting the ending application by the ending-APL selecting means, the control unit according to the first and second embodiments automatically ends the automatically-selected application. However, according to the third embodiment, the approval from the user is received before ending the automatically-selected application. Portions other than the addition of user approval processing are the same as that according to the first or second embodiment. Therefore, the block diagram and the flowchart other than the user processing according to the third embodiment are omitted.

Here, a description is given of the processing after automatically selecting the ending application by the ending-APL selecting means 74 of the control unit 7 shown in FIG. 1 and the ending-APL selecting means 86 of the control unit 8 shown in FIG. 6.

Figure 11:
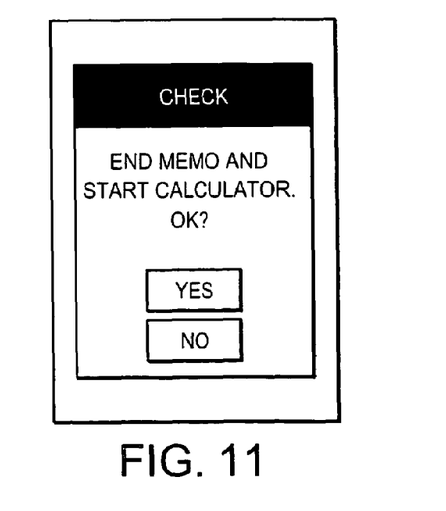
FIG. 11 is a diagram showing an example of a display screen.

Upon automatically selecting the ending application, a checking screen of the automatically-selected ending application and the starting application to be desired by the user is displayed as shown in FIG. 11 (in step S301) to ask the user whether or not the start of application is approved (in step S302).

When the user approves the start of application, the automatically-selected ending application ends (in step S305). Then, the application desired by the user starts (in step S306).

When the user does not approve the start of application, a display screen as shown in FIG. 4 is obtained to select the ending application from the list of started application (in step S303).

Here, when the user selects the ending application, the application selected by the user ends (in step S305). Then, the application desired by the user starts (in step S306).

When the user does not select the ending application in step S304, a dialog screen, as shown in FIG. 5, indicating that the application cannot start is displayed as one example of the display screen (in step S307).

In the operating example, user operating steps increases in the start of application when the number of applications is over the limiting one. However, the ending application is recognized in advance by the user and, when the user does not desire the ending of the application, another ending application is selected.

According to the above embodiments, the mobile phone is described. However, the present invention is not limited to the mobile phone device and may be applied to a mobile communication terminal device including a PHS device and a personal digital assistant.

What is claimed is:

1. A mobile communication terminal for starting and simultaneously using a plurality of applications, comprising:
    application start determining means which compares the number of started applications with a preset numerical value that is a maximum number of simultaneously used applications, determines that the application can start when the number of started applications is less than the numerical value, and determines that the application cannot start when the number of started applications reaches the numerical value;
    ending-priority list creating means which calculates values indicating the using situation of the started applications in response to the determination of the application start determining means that the application cannot start and creates a list of ending priority indicating the order of applications with low influence in the case of ending the application;
    ending-application selecting means which selects the ending application based on the list of ending priority in response to the determination of the application start determining means that the application cannot start and clears the list of ending priority;
    application ending means which performs the ending processing of the ending application selected by the ending-application selecting means;
    application starting means which starts the application instructed by a user in response to the determination of the application start determining means that the application starts; and
    wherein the ending-priority list creating means collects data on evaluation items indicating the using situations including the total time displayed after starting the application, the number of switching times for display operation, and the last display time, obtains the order of started applications every evaluated item, multiplies the order by a weighting coefficient preset every evaluated item and every type of application, adds the multiplied result every application, calculates the values indicating the using situations, sorts the applications in order of the larger values, and creates the list of ending priority.

2. An application starting control method of a mobile communication terminal for starting and simultaneously using a plurality of applications, comprising the steps of:
    presetting a numerical value that is a maximum number of simultaneously used applications;
    selecting, from started applications, an ending application to be ended based on a priority when the number of simultaneously used applications will exceed the numerical value;
    newly allowing to start an application after ending the selected ending application; and
    collecting data for the started applications, including a total time displayed after starting the application, the number of switching times for display operation, and the last display time, determining an order of the respective data for each of the started applications, multiplying each determined order by respective weighting coefficients for each of the started applications, adding the multiplied results for each of the started applications, and creating the priority by sorting the applications based on the added results.

3. A mobile communication terminal for starting and simultaneously using a plurality of applications, comprising:
    application start determining means which compares the number of started applications with a preset numerical value that is a maximum number of simultaneously used applications, determines that the application can start when the number of started applications is less than the numerical value, and determines that the application cannot start when the number of started applications reaches the numerical value;
    selecting means which selects an ending application to be ended on the basis of low priority from the started applications, in response to the determination of the application start determining means that the application cannot start;
    application ending means which performs ending processing of the ending application selected by the ending application selecting means;
    application starting means which starts the application instructed by a user in response to the determination of the application start determining means that the application can start; and
    ending-priority list creating means for collecting data on evaluation items indicating the using situations including the total time displayed after starting the application, the number of switching times for display operation, and the last display time, obtaining the order of started applications every evaluated item, multiplying the order by a weighting coefficient preset every evaluated item and every type of application, adding the multiplied result every application, calculating the values indicating the using situations, sorting the applications in order of the larger values, and creating a priority list.

* * * * *